3,382,216
TRANSPARENT THERMOPLASTIC TEREPHTHALIC ACID CONTAINING POLYAMIDES HAVING SOFTENING TEMPERATURES ABOVE 100° C.
Franz Blaschke and Werner Ludwig, Witten (Ruhr), Germany, assignors to Chemische Werke Witten G.m.b.H., Witten (Ruhr), Germany
No Drawing. Filed June 23, 1964, Ser. No. 377,416
5 Claims. (Cl. 260—78)

ABSTRACT OF THE DISCLOSURE

A transparent thermoplastic polyamide having a softening temperature in excess of 100° C. and a relative solvent viscosity in excess of about 1.8, said polyamide comprising a polycondensation product of hexamethylene diamine with a mixture containing 70–85% by weight of a compound selected from the group consisting of isophthalic acid and polyamide-forming derivatives thereof, and 30–15% by weight of a compound selected from the group consisting of terephthalic acid and polyamide-forming functional derivatives thereof.

---

It is known that polyhexamethylene terephthalamide, which is highly crystalline, extremely difficultly soluble, and has a melting and decomposition point of approximately 350° C., may be prepared from hexamethylene diamine and terephthaloyl chloride by contact or interface condensation. The preparation cannot be effected via the melting condensation route since the melting and the decomposition point practically coincide. It is completely unsuited for use as a thermoplastic material and for the production of molded parts or articles.

Also known is the polyamide made from hexamethylene diamine and isophthalic acid, which also may be obtained by melting condensation and which has a melting range of 150 to 210° C. The softening point of the non-crystalline polyhexamethylene isophthalamide is below 100° C., however, so that stability of form in boiling water does not exist.

It is also known to prepare a mixed polyamide from terephthalic acid, isophthalic acid and hexamethylene diamine with 50 mole percent terephthalic acid, having a melting point of 290° C. It is crystalline and displays an inadequate impact resistance when molded.

Also known is the preparation of transparent non-crystalline polyamides of terephthalic acid in which an isomeric mixture of 2- and 3-methyl hexamethylene diamine together with a trimethyl hexamethylene diamine is used as the diamine component. The use of these diamines with terephthalic acid is intended to result in polyamides which are suitable for the production of plastic molded parts. The fact that these diamines are difficultly available presents, however, a considerable obstacle for for the large-scale production of such polyamides.

It has now been found that non-crystalline, completely transparent and extremely tough polyamides having softening temperatures above 100° C. may be prepared by polycondensing mixtures containing 30 to 15 percent by weight of terephthalic acid and 70 to 85 percent by weight of isophthalic acid, or corresponding amounts of the polyamide-forming functional derivatives of these acids, with hexamethylene diamine according to known condensation procedures.

Experiments have shown that such mixed polyamides, containing 70 to 85 percent by weight of isophthalic acid, have an extremely low crystallizing tendency and retain a glass-clear, transparent appearance at all times during preparation and further treatment thereof. Even under a prolonged heat treatment at 140° C., there is no turbidity resulting from crystallization. These mixed polyamides have high strength and extraordinary impact resistance and are, therefore, excellently suitable for the preparation of injection-molded articles, extruded articles, and the like. These non-crystalline polyamides melt gradually over a wide temperature range. They are easily soluble only in the conventional polyamide solvents, such as phenol, cresol, formic acid or sulfuric acid. In contrast to other mixed polyamides (ultramide types), they are insoluble in aqueous methanol or chloroform/methanol mixtures; only swelling is observed in the latter.

Because of low water absorption properties, the materials of the invention can be used for electrical insulation, in addition to use as injection molding masses.

In order to obtain the desired properties, these polyamides require a molecular weight corresponding to a relative solvent viscosity of at least $\eta_{rel}$ 1.8. Excellent properties are obtained when the relative solvent viscosity is in the range of 2.2 to 2.8.

The relative solvent viscosity is determined by measuring a 1 percent polymer solution (1 g. polymer in 100 ml. of solution) in phenol/tetrachloroethane (60/40) at a temperature of 25° C. The softening temperature is determined according to the penetrometer method. The softening point is defined as that temperature at which a needle under load (total load 350 g., needle base 1 mm.$^2$) penetrates into a test object a distance of 0.1 mm.

Conventional processes may be employed for preparing the polyamides of the present invention. High molecular weight polyamides may thus be obtained by passing a mixture containing 70 to 85% by weight of hexamethylene diammonium isophthalate and 30 to 15 percent by weight of hexamethylene diammonium terephthalate into a 70 to 80 percent by weight aqueous solution, while excluding oxygen, and heating the same in an autoclave under pressure to a temperature of 230° C. The resulting pressure is about 27 atmospheres. After two hours reaction time, the temperature is increased to 270 to 280° C. and the pressure in the autoclave is simultaneously slowly reduced to atmospheric pressure.

While purging with nitrogen, the polycondensation is continued until the desired degree of polycondensation is attained. It is possible also to effect the preliminary condensation of the diamine salts in an organic solvent, such as o-, m-, or p-cresol, p-butyl phenol, hymol, o-oxydiphenyl or the xylenols, without using pressure, and to pass the solution of the low polymeric condensate into a high molecular weight polyamide at an elevated temperature (270 to 280° C.) in vacuo while simultaneously removing the solvent. The mixed polyamides may also be obtained by reacting the diphenyl esters of isophthalic acid and terephthalic acid with hexamethylene diamine. In this procedure, a mixture of 70 to 85 percent by weight of diphenyl isophthalate and 30 to 15 percent by weight of diphenyl terephthalate is melted at a temperature of 170° C. in the absence of air. A 50 percent by weight solution of the equivalent amount of hexamethylene diamine in a cresol solvent is slowly flowed into this melt. When the resulting reaction has subsided, heating to the polycondensation temperature is immediately effected and the cresol as well as the liberated phenol are removed in vacuo. High molecular weight polyamides may be obtained in this manner using short reaction times. In the process described, it is possible, of course, to employ short stopping agents for limiting the molecular weight.

It is also possible to produce the mixed polyamides according to the present invention by interface or contact condensation by flowing a corresponding mixture of terephthaloyl chloride and isophthaloyl chloride, dissolved in a solvent such as methylene chloride, into a dilute alkaline aqueous solution of hexamethylene diamine, while agitating vigorously.

The invention will be further illustrated by reference to the following specific examples:

Example 1

Preparation of polyhexamethylene isophthalamide/terephthalamide (75/25). 150 grams of hexamethylene diammonium isophthalate, 50 grams of hexamethylene diammonium terephthalate, 0.5 gram of hexamethylene diamine and 60 grams of distilled water are placed in a stainless steel autoclave. After removal of the atmospheric oxygen by evacuation and purging with nitrogen, the autoclave is heated to 230° C. whereby a pressure of about 27 kg./cm.$^2$ is produced. The salts are dissolved, under these conditions, to a completely clear solution and form a so-called preliminary condensate while water is split-off. After a residence time of two hours at this temperature, the temperature is increased to 275° C. over a period of 30 minutes and the pressure in the autoclave is simultaneously lowered to atmospheric pressure. The condensation is completed in 4 hours, while purging with nitrogen.

The mixed polyamide is a colorless, completely transparent, tough polycondensate having the following characteristics:

Relative viscosity _____ 2.6
Softening point _____ ° C__ 123
Melting range _____ ° C__ 167–218

Example 2

Preparation of polyhexamethylene isophthalamide/terephthalamide (75/25).

4.98 kg. isophthalic acid and 1.66 kg. terephthalic acid are suspended in 4.85 liters of water. Then, 4.686 kg. of hexamethylene diamine are slowly flowed in while purging with pure nitrogen. The reaction is initiated by heating and is terminated at a temperature of 90° C. The salt solution of about 70 percent concentration is then pressured into a condensation autoclave using nitrogen and a filter. The closed autoclave is heated to a temperature of 240° C. and maintained at that temperature for two hours. The temperature is then increased to 275° C. and the pressure is decreased to atmospheric pressure during a period of 40 minutes. The polycondensation is completed while purging with nitrogen.

A colorless, tough, non-crystalline polyamide is obtained having the following characteristics:

Relative viscosity _____ 3.01
Softening point _____ ° C__ 124
Melting range _____ ° C__ 163–220

Example 3

Preparation of polyhexamethylene isophthalamide/terephthalamide (80/20).

64 g. of hexamethylene diammonium isophthalate and 16 g. of hexamethylene diammonium terephthalate are suspended in 80 ml. of cresol in a condensation vessel. After adding 0.8 g. of hexamethylene diamine and while purging with pure nitrogen, the temperature is raised to 200° C. After two hours, the salts have become dissolved to form a preliminary condensate and the liberated water is condensed in a cooler and collected in a receiver. The condensation is continued at a temperature of 230° C. for two hours and the temperature is then increased to 270° C. whereby the main portion of the cresol distills over during 1 hour and the polycondensation continues. The residual cresol is removed during a period of two hours in a vacuum of at least 3 torr. and the polycondensation reaction is terminated.

A colorless, tough, non-crystalline polyamide is obtained having the following characteristics:

Relative viscosity _____ 2.6
Softening point _____ ° C__ 120
Melting range _____ ° C__ 163–193

Example 4

Preparation of polyhexamethylene isophthalamide/terephthalamide (75/25).

47.7 g. (0.15 mole) of diphenyl isophthalate and 15.9 g. (0.05 mole) of diphenyl terephthalate are melted together at 175° C. under pure nitrogen in a condensation flask provided with a stirrer. While purging with nitrogen, a solution of 23.2 g. (0.2 mole) of hexamethylene diamine dissolved in 40 ml. of cresol is slowly flowed in.

After the resulting reaction has subsided, the temperature is increased to 275° C. under vacuum. A colorless, tough, non-crystalline polyamide is obtained after a polycondensation time of one hour at about 1 torr. The product has the following characteristics:

Relative viscosity _____ 2.19
Softening point _____ ° C__ 123
Melting range _____ ° C__ 158–210

Example 5

Preparation of polyhexamethylene isophthalamide/terephthalamide (70/30).

A solution of 6.96 g. (0.06 mole) of hexamethylene diamine and 12.72 g. (0.12 mole) of sodium carbonate is placed in a one liter beaker. While this solution is stirred vigorously, a solution of 8.53 g. (0.045 mole) of isophthaloyl chloride and 3.65 g. (0.015 mole) of terephthaloyl chloride is quickly added thereto. The mixed polyamide precipitates out as white, crumbly mass. After 10 minutes of vigorous stirring, the product is filtered, washed, and dried.

The relative viscosity is 1.8.

It will be obvious to those skilled in the art that many modifications may be made within the scope of the present invention without departing from the spirit thereof, and the invention includes all such modifications.

What is claimed is:

1. A transparent thermoplastic polyamide of hexamethylene diamine with a mixture containing 70–85% by weight of a compound selected from the group consisting of isophthalic acid and polyamide forming functional derivatives thereof and 30–15% by weight of a compound selected from the group consisting of terephthalic acid and polyamide forming functional derivatives thereof, said polyamide having a softening temperature of about 120–124°.

2. A transparent thermoplastic polyamide of hexamethylene diamine with a mixture containing 70–85% by weight of a compound selected from the group consisting of isophthalic acid and polyamide forming functional derivatives thereof and 30–15% by weight of a compound selected from the group consisting of terephthalic acid and polyamide forming functional derivatives thereof, said polyamide having a softening temperature of about 120–124° C. and a relative solvent viscosity in excess of about 1.8, said relative solvent viscosity determined by measuring a 1% polymer solution in a solution of 60 parts phenol, 40 parts tetrachloroethane at a temperature of 25° C.

3. The polyamide of claim 2, wherein the relative solvent viscosity is about 2.2 to 2.8.

4. A polyamide according to claim 2 in which said mixture consists essentially of diphenyl isophthalate and diphenyl terephthalate.

5. A polyamide according to claim 2 in which said mixture consists essentially of isophthaloyl chloride and terephthaloyl chloride.

References Cited

UNITED STATES PATENTS

| | | | |
|---|---|---|---|
| 2,130,523 | 9/1938 | Carothers | 260—78 |
| 2,766,222 | 10/1956 | Lum et al. | 260—78 |
| 2,831,834 | 4/1958 | Magat | 260—78 |
| 3,145,193 | 8/1964 | Gabler | 260—78 |
| 3,150,117 | 9/1964 | Gabler | 260—78 |

WILLIAM H. SHORT, *Primary Examiner.*

H. D. ANDERSON, *Assistant Examiner.*